United States Patent [19]

Gibbs et al.

[11] Patent Number: 4,923,311
[45] Date of Patent: May 8, 1990

[54] PRELOADED SLIDE BEARING SUPPORT APPARATUS

[76] Inventors: Henry L. Gibbs, 273 Union St., Millis, Mass. 02054; Allan E. MacNicol, P.O. Box 104, Sherborn, Mass. 01770

[21] Appl. No.: 316,827

[22] Filed: Feb. 28, 1989

[51] Int. Cl.$^5$ .................... F16C 29/04; F16C 29/12
[52] U.S. Cl. ................................ 384/49; 384/50; 384/54; 384/57
[58] Field of Search .................... 384/38–40, 384/47, 49, 50, 54–57

[56] References Cited

U.S. PATENT DOCUMENTS

| | | | |
|---|---|---|---|
| 2,672,378 | 3/1954 | McVey | 384/49 |
| 3,113,807 | 12/1963 | Polidor | 384/49 |
| 3,342,534 | 9/1967 | King | 384/49 |
| 3,790,233 | 2/1974 | Polidor | 384/56 X |
| 3,897,119 | 7/1975 | McMurtrie | 384/55 |
| 4,684,266 | 8/1987 | Furmanek et al. | 384/37 |

FOREIGN PATENT DOCUMENTS

| | | | |
|---|---|---|---|
| 38215 | 2/1986 | Japan | 384/49 |
| 703762 | 2/1954 | United Kingdom | 384/49 |

*Primary Examiner*—Thomas R. Hannon
*Attorney, Agent, or Firm*—John E. Toupal; Harold G. Jarcho

[57] ABSTRACT

A slide bearing support having one member slidable on another member and including a pair of parallel slide bearing assemblies disposed between the members. Each bearing assembly comprises a plurality of elongated, rectilinear rods having central axes parallel to each other, the longitudinal surfaces of each of the rods including an elongated curved portion and an oppositely directed coextending flat portion, the flat portions of the rods being spaced apart and facing each other to define an elongated rectilinear raceway; an elongated retainer disposed in the raceway; a plurality of rollers disposed in the retainer and contacting the flat portions on the rods; and rod support surfaces defined by each of the members, the support surfaces defined by the one member contacting the curved portion on one of the rods and the support surfaces defined by the another member contacting the curved portion on the other of the rods, and wherein the support surfaces are shaped so as to restrict movement of the rods in directions transverse their axes and to allow unrestrained rotational movement of the entire rods thereabout without creating torsional stresses therein. Also included in the slide bearing support is a loading mechanism for producing between the rods, the rollers and the surfaces loading forces directed transverse to the central axes and comprising resilient means retained under compression between one of the members and at least one of the rods.

16 Claims, 3 Drawing Sheets

PRELOADED SLIDE BEARING SUPPORT APPARATUS

BACKGROUND OF THE INVENTION

This invention relates to linear slides and more particularly to a linear slide having one member which slides on another, one of the members being bifurcated and straddling the other with linear bearings on each side of the straddled member connecting it to the bifurcations of the other member.

Linear slides generally include a bifurcated member straddling another. Either member can be fixed and the other slides with respect to it on two linear bearings sandwiched between the bifurcations of the one member and the sides of the straddled member. Heretofore, each of the linear bearings has included a pair of opposing raceways, one carried by one member and the other carried by the other, with a set of balls or rollers riding in each pair of raceways.

One prior structure places four longitudinally running rods in each raceway. Two of the rods carried by one member and two by the other member. Rollers ride on all four rods in the raceway and preload is applied by adjusting the longitudinal position of a tapered gib that rides in a tapered slot in one of the members and bears against two of the rods in one of the raceways carried by the same member. Means are in one of the members for preloading the bearings in the raceways so that lateral motion of one member with respect to the other in a direction transverse to the direction of slide is prohibited. This preload is adjustable to prevent backlash compensate for wear between the rollers and raceways. Examples of bearing slides of this type are disclosed in U.S. Pat. Nos. 3,790,233 and 3,897,119. Although generally functioning well, these prior preload mechanisms exhibit certain disadvantages such as the requirement for precision adjustment which can result in higher cost and unstability.

The object of this invention, therefore, is to provide a linear bearing slide with an improved preloading mechanism.

SUMMARY OF THE INVENTION

The invention is a slide bearing support having one member slidable in a given direction relative to another member and including a pair of parallel slide bearing assemblies disposed between the members. Each bearing assembly provides a raceway defining a travel path in the given direction; an elongated retainer disposed in the raceway; and a plurality of rollers disposed in the retainer and supported by the raceway which guides movement of the rollers along the travel path. Also included in the support is a loading mechanism for producing between the raceways and the rollers loading forces directed transverse to the travel path, the loading mechanism comprising resilient means retained under compression between one of the members and at least one of the raceways. The resilient loading mechanism efficiently provides for the bearing assemblies a desired preload. In addition, the compliance exhibited by the resilient mechanism compensates for any curvature in the travel of the bearing assemblies and prevents shock damage thereto.

According to particular features of the invention, the one member is bifurcated and straddles the other member, the raceways include surfaces formed by longitudinally extending grooves in the side of each bifurcation face and opposed longitudinally extending grooves in the sides of the other member with the rectangular grooves forming an elongated four cornered rectangular chamber and an elongated rectilinear rod positioned in each corner of the chamber. In this arrangement the rods form for the rollers raceways that are self adjusting for wear.

According to a specific feature of the invention, the resilient means comprises an elongated block of resilient material retained between the one member and an adjacent pair of the rods and substantially parallel to and coextensive therewith. The resilient block provides a highly stable easily assembled preload mechanism.

According to one embodiment of the invention, each of the rods includes an elongated curved portion and an oppositely directed coextending flat portion, the flat portions of the rods being spaced apart and facing each other to define the raceway and cylindrical surfaces of the rollers contact the flat portions on the rods. The support surfaces contact the curved portions of the rods and restrict movement thereof in directions transverse to their axes and allow unrestrained rotational movement thereof without creation of torsional stresses.

According to another embodiment of the invention, the rods are cylindrical and the rollers are spherically shaped balls. The balls and cylindrical rods provide a simple bearing structure.

According to another feature of the invention, the loading mechanism further comprises a gib disposed between the resilient means and the adjacent rods. The gib permits adjustment in the level of preload applied to the bearing assemblies.

According to yet another feature of the invention, the one member defines an elongated slot retaining the loading mechanism in contact with portions of the adjacent pair of rods. The retaining slot simplifies fabrication and assembly of the loading mechanism.

DESCRIPTION OF THE DRAWINGS

The various features of the present invention whereby the above stated objects are carried out are incorporated in the embodiments of the invention described herein which represents the best known uses of these features of the invention. These and other objects of the invention will appear from the following specific description of the embodiments taken in conjunction with the figures in which.

DESCRIPTION OF THE PREFERRED EMBODIMENT

Figure 1:
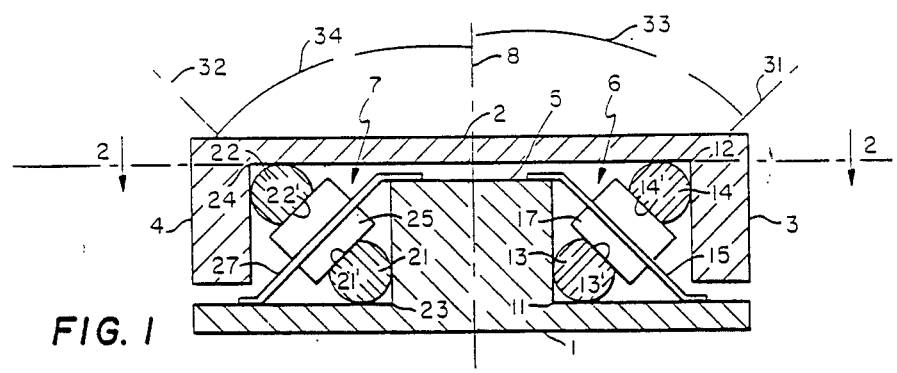
FIG. 1 is an end elevation section view of a linear slide with a single set of rods and rollers in each linear bearing.
Figure 2:
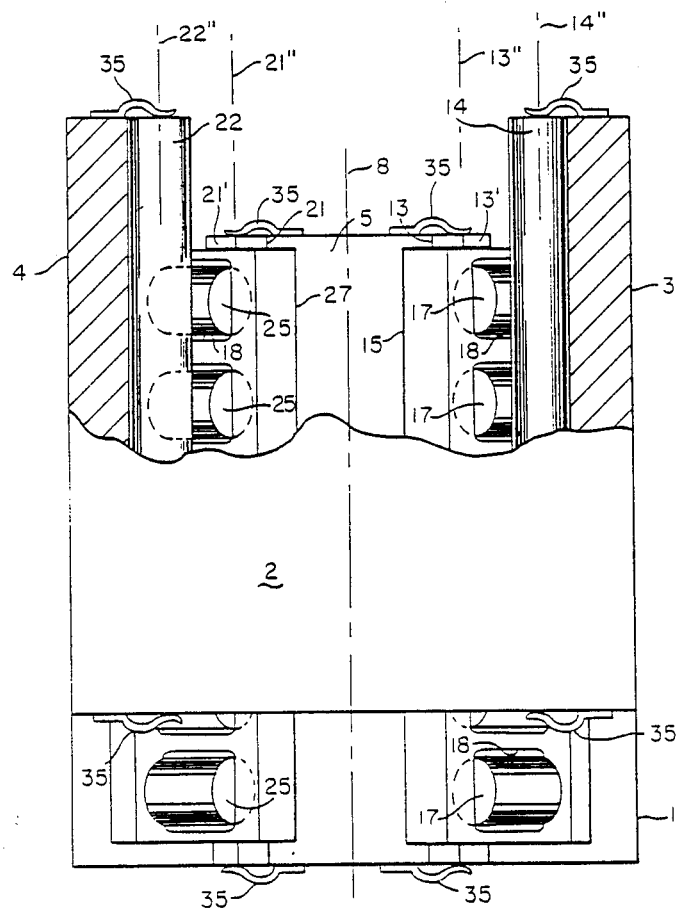
FIG. 2 is a top section view of the slide in FIG. 1.

A linear bearing slide with self adjusting raceways and roller bearings is shown in FIGS. 1 and 2. FIG. 2 is partly broken away to reveal the details of the linear bearings. The slide consists of a base member 1 and a slide member 2 which is bifurcated in that two legs 3 and 4 of the slide member straddle the pedestal 5 at the center of the base member. The linear bearings 6 and 7 are contained between the pedestal 5 of the base member and the two legs 3 and 4, respectively, of the slide member. The linear bearings 6 and 7 are identical in all respects and differ only in that one is a mirror image of the other with respect to the plane 8 through the center of the slide.

Linear bearing 6 is defined by diagonally opposed V grooves 11 and 12 in the base member and slide member, respectively. Within these grooves, at the corners are contained the bearing rods 13 and 14 which provide self adjustable raceways. A plurality of roller bearings such as 17 ride on flat surfaces 13' and 14' of the diagonally opposed rods 13 and 14, respectively. A cage or retainer 15 is provided to space the roller bearings which fit loosely in holes 18 in the cage. These are holes slightly wider and longer than the rollers spaced along a flat piece of material that forms the cage, the bearings fitting loosely in the holes. The cage may be attached to the base or slide member or it may "float" and be limited by stops carried by the base or slide. In this embodiment, the cage is attached to the base member.

Linear bearing 7 is similar to linear bearing 6. It contains rods 21 and 22 in diagonally opposed V grooves 23 and 24, respectively. Roller bearings 25 ride on flat surfaces 21' and 22' of diagonally opposed rods 21 and 22, respectively, and are spaced by retainer 27 constructed substantially as retainer 15.

The rods, rollers, and cages in the linear bearings 6 and 7 are all identical and interchangeable and these bearings are mirror images with respect to the center plane 8. The axes of the rods in bearings 6 and 7 define planes 31 and 32 which form equal angles 33 and 34 with the plane 8. This angle is between zero and 45°. In the embodiment shown, it is 45°. The rods are held in place by clips 35 at the ends of the base and slide and can be removed and replaced without removing the other parts of the bearing.

In operation, the weight of the slide causes the rollers in each bearing to contact the flat surfaces on the diagonal rods. The force of the rollers against the flat surface on each rod rotates the rod on its axis, if necessary, to make the diagonal flat surfaces parallel and so these raceway surfaces adjust in use to provide parallel raceways for the rollers. The rod flat surface is sufficiently wide so that contact of the roller with an edge of the flat surface exerts a torque on the rod about its axis which easily turns the rod in its V groove.

Figure 6:
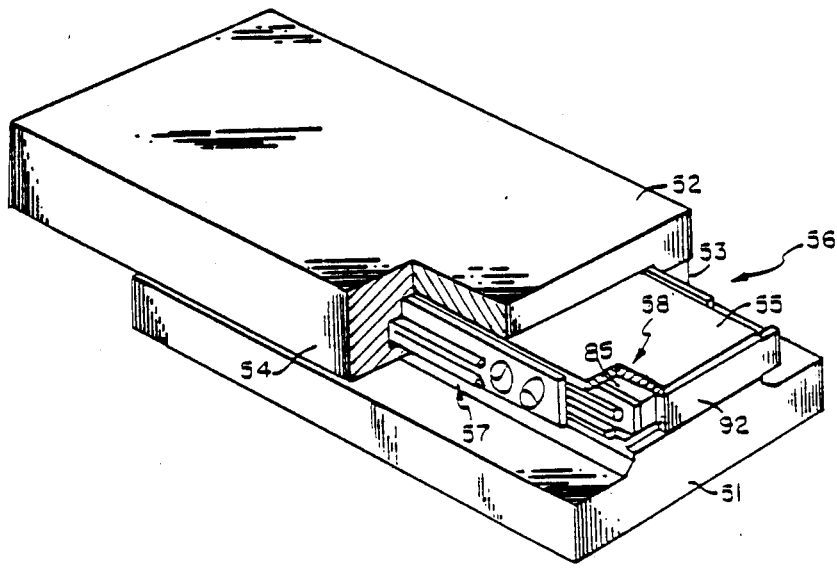
FIG. 6 is a three-quarter view of the linear slide shown in FIGS. 3 to 5, partially broken away illustrating the external appearance of the slide and some of the inside parts.

The linear slide shown in FIGS. 1 and 2 cannot carry loads tending to pull the base and slide apart. It carries loads having a net tendency to force the base and slide together. Furthermore, the bearings cannot be preloaded laterally. The only preload is the weight of the slide on the base. The embodiment illustrated by FIGS. 3 and 6 includes two sets of rods and roller bearings in each linear bearing. It can carry loads in any direction and the bearings can be preloaded laterally. This structure is shown in FIG. 6 which is a three-quarter view of the slide slightly broken away to reveal the details of one of the linear bearings. The slide consists of a base member 51 and a slide member 52 which is bifurcated in that two legs 53 and 54 of the slide member straddle the pedestal 55 at the center of the base member. The linear bearings 56 and 57 are contained between the pedestal 55 of the slide member. The linear bearings 56 and 57 are identical in many respects and different only in that one makes connection with a mechanism for preloading the bearings. This mechanism 58 is contained in the base member 51 and exerts a force such that both the linear bearings 56 and 57 are preloaded.

Figure 3:
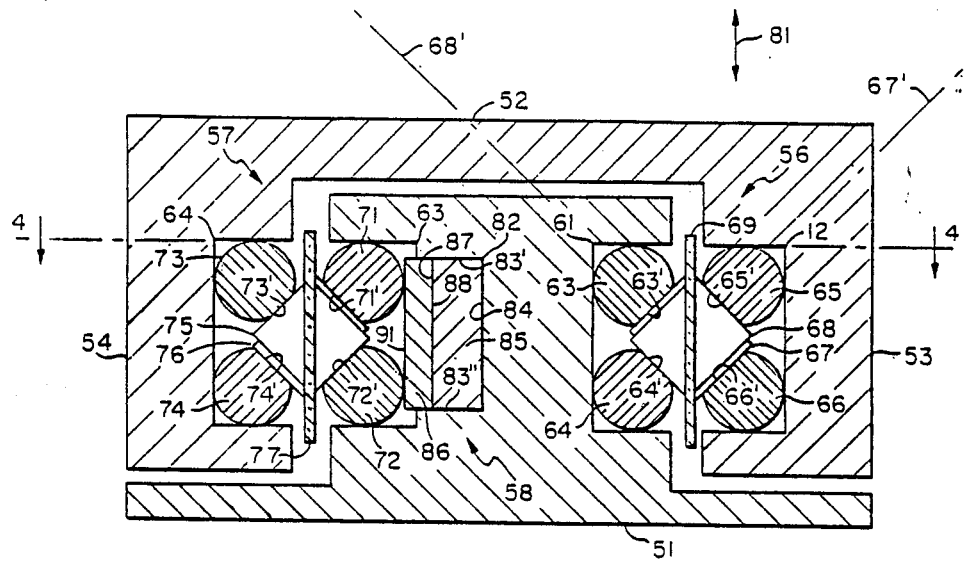
FIG. 3 is an end elevation section view of a linear slide with two sets of rods and rollers in each linear bearing.
Figure 5:
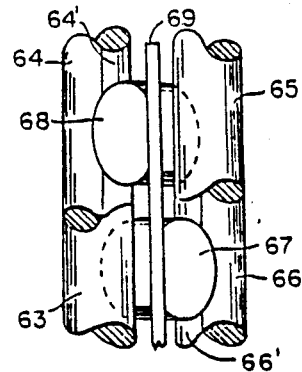
FIG. 5 is an enlarged portion of FIG. 4 showing two adjacent roller bearings in a raceway from the top on the same scale as FIG. 3.

FIGS. 3 and 5 show front and top sectional views of this linear slide revealing details of the linear bearings and the preload mechanism. Linear bearing 56 is defined by opposing channels in the pedestal of the base member and leg of the slide member, respectively. Within these channels at the corners are contained the bearing rods 63 and 64 in channel 61 and 65 and 66 in channel 62. A plurality of roller bearings such as 67 and 68 ride on flat surfaces of the rods 63 to 66. The roller bearings 67 oriented in one direction ride on the flat surfaces 63' and 66' of the diagonally opposed rods 63 and 66, respectively. Similarly, the roller bearings 68 oriented perpendicular thereto ride on the flat surfaces 64' and 65' of the diagonally opposed rods 64 and 65, respectively. A cage or retainer 69 is provided to space the roller bearings 67 and 68, the bearings fitting loosely in holes in the cage. These may be oblong holes spaced along a flat piece of material that forms the cage, the bearings fitting loosely in the holes. The function of these holes is to space the bearings.

Linear bearing 67 is similar in that it contains rods 71 to 74 in positions corresponding to rods 63 to 66, respectively. Roller bearings 75 oriented in one direction ride on flat surfaces 73' and 72' of diagonally opposed rods 73 and 72, respectively, and rollers 26 oriented perpendicular thereto ride on flat surfaces 71' and 74' of of diagonally opposed rods 71 and 74, respectively. Rollers 75 and 76 are spaced by retainer 77 constructed substantially as retainer 69.

All rollers in both the linear bearings 56 and 57 are of smaller length than diameter so that the ends of each roller clear the flat surfaces of the two diagonally opposed rods on which that particular roller does not ride. This is a requirement of both the linear bearings 56 and 57. It is preferred that the axes such as 67' and 68' of rollers which ride on different diagonally opposed rods lie in perpendicular planes and the flat surfaces on the four rods in the bearing define the four edges of a square as viewed from the end. Furthermore, in such a preferred embodiment all the rods in the bearing are identical and so the opposing channels on which the rods are contained define a square as viewed from the end. On the other hand, if the axes such as 67' and 68' do not lie in perpendicular planes, then the flat surfaces of the rods will not define the edges of a square as viewed from the end. In either case, however, it is essential that the diameter of a roller bearing be greater than the length thereof. It is preferred that all the rollers in both the linear bearings 56 and 57 are identical, all rods in both are identical and the retainers 77 and 69 are identical. Accordingly, these parts are interchangeable.

In operation, the rods adjust by the force of the rollers on the flats just as in the slide shown in FIGS. 1 and 2. The rods contained in the channels at the corners of the channels tend to turn about their axes making the diagonal flats parallel until the rollers are in flush contact with both diagonal flats. Thus, the flats which are the raceways are self adjusting.

The flats on two adjacent rods in the same channel (such as flats 65' and 66') define a self adjusting V raceway for the two sets of orthogonally oriented roller bearings 67 and 68. This V raceway can be replaced readily by merely sliding the rods from the member and inserting new rods.

By virtue of the preferred construction of the linear bearings 56 and 57 described above, there results in operation, regardless of the types and direction of loads on the device, no tendency for a roller bearing to roll on any axis except its own cylindrical axis. Assuming the base member 51 is to be fixed, loads transverse to the direction of slide and along a direction which is 45° counterclockwise to the up-down direction indicated by arrow 81 are all borne by the roller bearings 67 and 75 in the linear slides. Similarly, transverse loads at 45° clockwise to the up-down direction are all borne by roller bearings 68 and 76 in slides. Any transverse load can be broken down into vectors and so distributed between the rollers. However, there is no transverse load which will tend to cause a roller to roll about any axis except its own cylindrical axis and so slippage between a roller bearing surface and the flat surfaces upon which it rides is very unlikely.

The preload mechanism 58 in the embodiment described herein is located in the base member and consists of a slot 82 opening into the bottom of channel 63 of linear bearing 57. This slot is defined by two side walls 83' and 83" and a bottom surface 84. The slot is parallel to the direction of slide and extends substantially coextensively along the adjacent rods 71 and 72, the bottom of the slot 84 being entirely parallel to the rods. Fitting into this slot and extending the length of it is a compliant, resilient block 85 preferably formed of rubber or an elastomer having a hardness measurable by a Type A durometer with a specifically desirable material being buna-rubber. Also retained in the slot between the block 85 and curved portions of the adjacent rods 71 and 72 is an elongated gib shim 86. The engaged surfaces of the block 85 and shim 86, respectively, are contiguous and the match is such that the outside surface 87 of the block 85 which is contiguous with the bottom 84 of the slot and the outside surface 91 of the adjustable gib 86 are entirely parallel to each other. The surface 91 contacts curved surfaces of two rods 71 and 72 contained in the channel 63 and so determines the horizontal position of these rods relative to the rods 63 and 74 in the opposing channel 64. Adjustment of the longitudinal position of the gib 86 adjusts the compression on the compliant, resilient block 85 which in turn applies a transverse force on the rods 71 and 72. Thus, all the bearings 75 and 76 which bear on these rods are loaded and this loading is transmitted to linear bearing 56 as well.

Plates at the ends of linear bearings 56 and 57 restrain the longitudinal positions of the rods. Slide end plates such as 92 restrict the longitudinal positions of the rods 65, 66, 73 and 74 and plates such as 93 at the ends of the base member fix the longitudinal positions of the rods 63, 64, 71 and 72 contained in the base member. Screw stops such as 94 in the end plate 93 fix the position of the block 85. While an adjusting screw 95 in one of the plates 93 abuts the adjustable gib 86 and moves it longitudinally to adjust the preload on the bearings.

Figure 4:
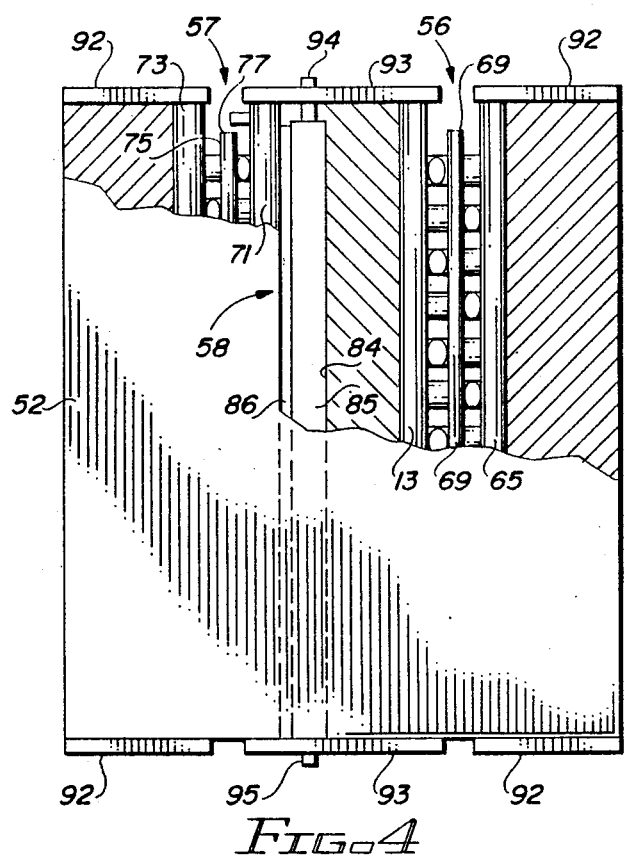
FIG. 4 is a top view partly in section of the linear slide shown in FIG. 3 at half the scale thereof.
Figure 7:
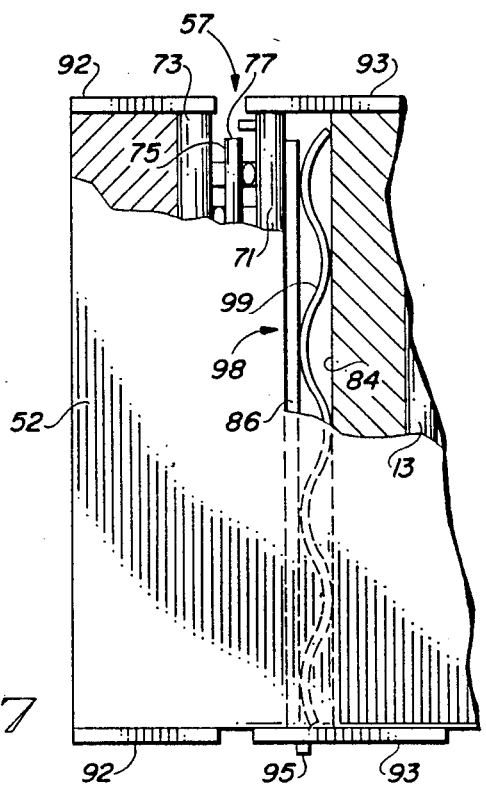
FIG. 7 is a top view partly in section of a linear slide with a modified preloading mechanism.

FIG. 7 illustrates another linear slide embodiment with a modified preload mechanism 98. In this embodiment, the block 85 of FIGS. 3 and 4 is replaced by a compliant, resilient serpentine spring member 99. Operation of this embodiment is similar to that described above with the spring 98 being held in compression by the adjustment gib 86 so as to apply a transverse loading force to curved portions of the adjacent rods 71 and 72. Accordingly, an adjustable preload is provided on all bearings of the slide.

Figure 8:
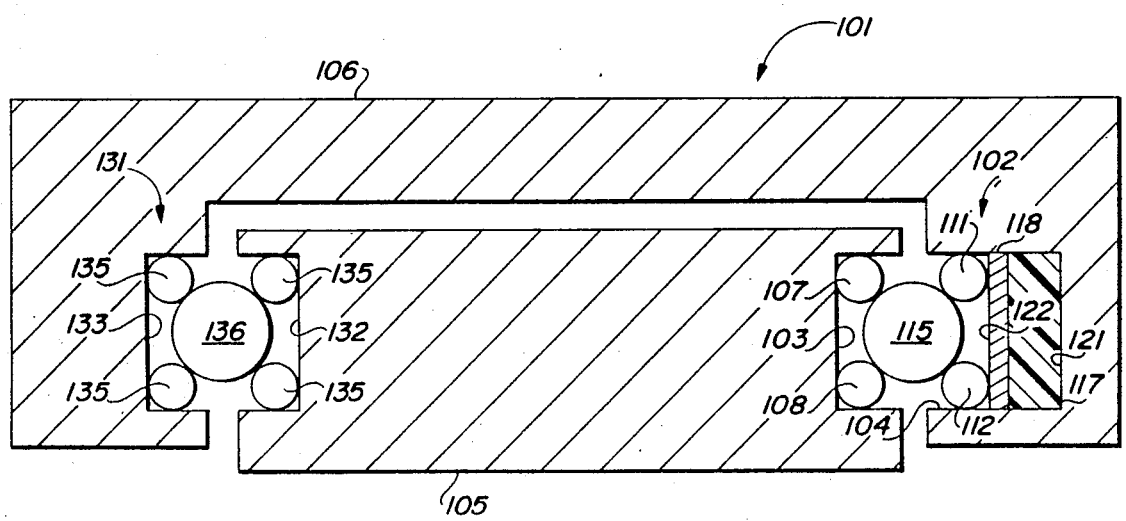
FIG. 8 is a cross sectional view of another linear slide embodiment of the invention.

Illustrated in FIG. 8 is another linear slide embodiment 101 similar to the embodiment shown in FIGS. 3-6. A linear bearing 102 is defined by opposing channels 103, 104 in a base member 105 and a leg of a slide member 106, respectively. Within the channels 103, 104, respectively, are mounted elongated, rectilinear bearing rods 107, 108 and 111, 112 which have parallel central axes and form an elongated raceway. Retained in that raceway are a plurality of spherically shaped ball roller bearings 115 that ride on the cylindrical surfaces of the rods 107, 108, 111, 112.

Extending parallel to the rods 111, 112 is a compliant, resilient block 117 retained in the channel 104 and coextensive therewith. Also retained in the channel 104 between the block 117 and surfaces of the adjacent rods 111 and 112 is an elongated gib shim 118. Engaged surfaces of the block 117 and shim 118, respectively, are contiguous and the match is such that the outside surface 119 of the block 117 and the outside surface 122 of the adjustable gib 118 are entirely parallel to each other. The outside surface 122 contacts surfaces of the rods 111 and 112 contained in the channel 104 and so determines the horizontal position of these rods relative to the rods 107 and 108 in the opposing channel 103. Adjustment of the longitudinal position of the gib 118 adjusts the compression on the compliant, resilient block 117 which in turn applies a transverse force on the rods 107, 108 and 111, 112. Thus, all the ball rollers 115 that bear on these rods are selectively and uniformly loaded by adjustment of the gib 118.

Another linear bearing 131 extending parallel to the bearing 102 is formed by channels 132, 133 in the base member 105 and slide member 106, respectively; elongated rods 135; and ball rollers 136. The linear bearing 131 is identical to the linear bearing 102 except for the absence of the block 117 and gib 118. Transverse forces applied by the block 117 directly to the linear bearing 102 is transferred also to the linear bearing 131 to thereby load the ball rollers 136. Operation of the embodiment 101 is similar to that described above for the embodiment illustrated in FIGS. 3-6.

Obviously, many modifications and variations of the present invention are possible in light of the above teachings. It is to be understood, therefore, that the invention can be practiced otherwise than as specifically described.

What is claimed:

1. A slide bearing support apparatus including one member slidable in a given direction relative to another member, the combination comprising:
   a pair of parallel slide bearing assemblies disposed between said members and each comprising:
   raceway means defining a travel path in the given direction;
   an elongated retainer means disposed in said raceway;
   a plurality of rollers disposed in said retainer means and supported by said raceway means, said raceway means adapted to guide movement of said one member on said rollers along said travel path; and preload means for producing between said raceways and said rollers preload forces directed transverse to said travel path; said preload means comprising an elongated block of resilient material retained under compression between one of said members and at least one of said raceways and extending substantially parallel to and coextensive with said at least one said raceway, said resilient material having a hardness in a range measurable by a Type A durometer.

2. An apparatus according to claim 1 wherein each said raceway means comprises a plurality of elongated rectilinear rods having central axes parallel to each other and straddling and contacting said rollers, and said resilient loading means is retained under compression between one of said members and at least one of said rods.

3. An apparatus according to claim 2 wherein said rollers are spheres.

4. An apparatus according to claim 2 wherein said rollers are cylinders.

5. An apparatus according to claim 2 wherein longitudinal surfaces of each of said rods includes an elongated curved portion and an oppositely directed coextending flat portion, said flat portions of said rods being spaced apart and facing each other to define one of said raceways; and said rollers contact the flat portions on said rods.

6. An apparatus according to claim 5 wherein each of said members defines rod support surfaces, said support surfaces defined by said one member contacting the curved portion on one of said rods and said support surfaces defined by said another member contacting the curved portion on the other of said rods, and wherein said support surfaces are shaped so as to restrict movement of said rods in directions transverse their axes and to allow unrestrained rotational movement of the entire rods thereabout without creating torsional stresses in said rods.

7. An apparatus according to claim 6 wherein said support surfaces comprise a pair of planar surfaces tangent to said curved portions on said rods so as to establish therewith contact only along elongated lines parallel to the axes of said rods.

8. An apparatus according to claim 7 wherein said curved portions are circular and said lines of contact are spaced 90° apart thereon.

9. An apparatus according to claim 2 wherein each of said members has rectangular grooves that define planar support surfaces contacting said rods.

10. An apparatus according to claim 9 wherein said one member is bifurcated and straddles the other member, and said grooves include longitudinally extending grooves in the side of each bifurcation face and opposed longitudinally extending grooves in the sides of the other member.

11. An apparatus according to claim 10 wherein said opposed rectangular grooves form an elongated, four cornered rectangular chamber, and one of said rods is positioned in each corner of said chamber.

12. An apparatus according to claim 11 wherein said resilient block is retained between said one member and an adjacent pair of said rods.

13. An apparatus according to claim 12 wherein said preload means further comprises a gib means for retaining said block of resilient material under compression.

14. An apparatus according to claim 13 wherein said one member defines an elongated slot retaining said preload means in contact with said adjacent pair of said rods.

15. An apparatus according to claim 14 wherein said block of resilient material is composed of rubber.

16. An apparatus according to claim 1 wherein said preload means further comprises a gib means for retaining said block resilient material under compression.

* * * * *